(12) United States Patent
Nie

(10) Patent No.: US 12,026,662 B2
(45) Date of Patent: Jul. 2, 2024

(54) COMMODITY CHANGE INFORMATION GENERATION METHOD AND APPARATUS, COMMODITY SORTING METHOD AND APAPRATUS, AND ELECTRONIC DEVICE

(71) Applicant: BOE Technology Group Co., Ltd., Beijing (CN)

(72) Inventor: Chao Nie, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/432,457

(22) PCT Filed: Feb. 18, 2021

(86) PCT No.: PCT/CN2021/076751
§ 371 (c)(1),
(2) Date: Aug. 19, 2021

(87) PCT Pub. No.: WO2021/164707
PCT Pub. Date: Aug. 26, 2021

(65) Prior Publication Data
US 2023/0351318 A1    Nov. 2, 2023

(30) Foreign Application Priority Data
Feb. 20, 2020  (CN) .......................... 202010105145.3

(51) Int. Cl.
G06Q 10/087    (2023.01)
G06Q 20/00    (2012.01)

(52) U.S. Cl.
CPC .................................. *G06Q 10/087* (2013.01)

(58) Field of Classification Search
CPC ... G06Q 10/087; G06Q 10/0875; G06Q 30/06
(Continued)

(56) References Cited

U.S. PATENT DOCUMENTS 11,587,031 B2 *  2/2023  Nobuoka ............... H04N 23/60
2004/0128196 A1 *  7/2004  Shibuno ............. G06Q 30/0271
                                                                    705/14.66
(Continued)

FOREIGN PATENT DOCUMENTS

CN  106779865 A  5/2017
CN  108073954 A  5/2018
(Continued)

OTHER PUBLICATIONS

CN202010105145.3 second office action.

*Primary Examiner* — Garcia Ade
(74) *Attorney, Agent, or Firm* — IPro, PLLC

(57) ABSTRACT

A commodity change information generation method and apparatus, a commodity sorting method and apparatus, and an electronic device are disclosed. The commodity change information generation method comprises: acquiring original commodity arrangement information of a to-be-tidied shelf and standard commodity arrangement information corresponding to the to-be-tidied shelf; acquiring first commodities and second commodities in multiple original commodities, as well as first commodities and third commodities in multiple standard commodities; determining first position change information of the first commodities according to original position information and standard position information of the first commodities; and determining second position change information of the second commodities and the third commodities according to original position information of the second commodities, standard position information of the third commodities, and the first position change information.

20 Claims, 6 Drawing Sheets

(58) Field of Classification Search
USPC ............................................................ 705/28
See application file for complete search history.

(56) References Cited

U.S. PATENT DOCUMENTS

| | | | |
|---|---|---|---|
| 2018/0253708 A1* | 9/2018 | Mohanakrishnan | ........................ G06Q 30/0601 |
| 2023/0038289 A1* | 2/2023 | Glaser | .................. G06Q 20/208 |

FOREIGN PATENT DOCUMENTS

| CN | 108175227 A | 6/2018 |
|---|---|---|
| CN | 108241941 A | 7/2018 |
| CN | 109784319 A | 5/2019 |
| CN | 110390446 A | 10/2019 |
| CN | 111340422 A | 6/2020 |
| HK | 1132570 A | 2/2010 |
| WO | 2008039157 A1 | 4/2008 |

\* cited by examiner

COMMODITY CHANGE INFORMATION GENERATION METHOD AND APPARATUS, COMMODITY SORTING METHOD AND APAPRATUS, AND ELECTRONIC DEVICE

The disclosure claims priority to Chinese Patent Application No. 202010105145.3, entitled "COMMODITY CHANGE INFORMATION GENERATION METHOD AND APPARATUS, COMMODITY SORTING METHOD AND APPARATUS, AND ELECTRONIC DEVICE", filed with the China National Intellectual Property Administration on Feb. 20, 2020, which is incorporated herein by reference in its entirety.

TECHNICAL FIELD

The disclosure relates to the field of information technology, in particular to a commodity change information generation method and apparatus, a commodity sorting method and apparatus, and an electronic device.

BACKGROUND

At present, with the further development of IoT and information technology, goods management systems have been more or less introduced in various shops and convenience stores, and have become common goods settlement systems.

With the gradual popularization of electronic shelf label products, more and more shops have introduced more sophisticated management means to realize finer management of their franchised stores, one of which is that some supermarkets separately dispatch a commodity exhibition task for each shelf in each store and shop assistants take all commodities down from the shelf and then rearrange commodities on the shelf after receiving the task.

SUMMARY

The disclosure provides a commodity change information generation method and apparatus, a commodity sorting method and apparatus, and an electronic device.

The disclosure discloses a commodity change information generation method which is applied to a service terminal and comprises:
  acquiring original commodity arrangement information of a to-be-tidied shelf and standard commodity arrangement information corresponding to the to-be-tidied shelf, wherein the original commodity arrangement information includes names and original position information of multiple original commodities, and the standard commodity arrangement information includes names and standard position information of multiple standard commodities.
  standard commodities;
  acquiring identical commodities in the plurality of original commodities and the plurality of standard commodities, and taking the identical commodities as first commodities;
  determining first position change information of the first commodities according to the original position information and standard position information of the first commodities;
  acquiring second commodities in the plurality of original commodities and third commodities in the plurality of standard commodities, wherein the second commodities, the third commodities and the first commodities are different; and
  determining second position change information of the second commodities and the third commodities according to the original position information of the second commodities, the standard position information of the third commodities, and the first position change information;
  wherein, commodity change information comprises the first position change information and the second position change information.

Optionally,

To solve the above problems, the disclosure discloses a commodity sorting apparatus which is applied to a commodity sorting terminal and comprises:
  A position change information receiving module used for receiving first position change information and second position change information, corresponding to a to-be-tidied shelf, sent from a server; and
  A commodity sorting module used for sorting commodities on the to-be-tidied shelf according to the first position change information and the second position change information.

Optionally, the step of determining first position change information of the first commodities according to the original position information and standard position information of the first commodities comprises:
  comparing the original position information of the first commodities with the standard position information of the first commodities; and
  determining the first position change information of the first commodities according to a comparison result.

Optionally, the step of determining the first position change information of the first commodities according to the comparison result comprises:
  determining the positions of the first commodities are not changed when the original position information of the first commodities is identical with the standard position information of the first commodities, and taking the information indicating that the positions of the first commodities are not changed as the first position change information.

Optionally, the step of determining the first position change information of the first commodities according to a comparison result comprises:
  sequentially disposing all the first commodities according to an arrangement order corresponding to the standard position information of all the first commodities when the original position information of the first commodities is different from the standard position information of the first commodities to obtain a first commodity arrangement result; and
  determining position adjustment information of the first commodities according to the first commodity arrangement result, and taking the position adjustment information as the first position change information.

Optionally, the step of determining position adjustment information of the first commodities according to the first commodity arrangement result, and taking the position adjustment information as the first position change information comprises:
  determining a to-be-changed commodity in the first commodities according to the first commodity arrangement result;

generating unshelving information of the to-be-changed commodity according to the original position information of the to-be-changed commodity;
generating shelving information of the to-be-changed commodity according to the standard position information of the to-be-changed commodity; and
determining the unshelving information and the shelving information as the first position change information of the to-be-changed commodity.

Optionally, the number of the to-be-changed commodities is greater or equal to two, after the step of determining the to-be-changed commodities in the first commodities according to the first commodity arrangement result, the method further comprises:
determining the commodity ranked first in the to-be-changed commodities as a first to-be-adjusted commodity according to assorting order corresponding to the original position information of the to-be-changed commodities, and determining other commodities in the to-be-changed commodities as second to-be-adjusted commodities.

Optionally, after the step of determining the commodity ranked first in the to-be-changed commodities as a first to-be-adjusted commodity according to assorting order corresponding to the original position information of the to-be-changed commodities, and determining other commodities in the to-be-changed commodities as second to-be-adjusted commodities, the method further comprises:
generating first unshelving information of the first to-be-adjusted commodity according to the original position information of the first to-be-adjusted commodity, and determining first shelving position information of the first to-be-adjusted commodity according to the standard position information of the first to-be-adjusted commodity;
generating second unshelving information of the second to-be-adjusted commodities according to the original position information of the second to-be-adjusted commodities, and determining second shelving position information of the second to-be-adjusted commodities according to the standard position information of the second to-be-adjusted commodities; and
determining the first unshelving information and the first shelving position information as first position change information of the first to-be-adjusted commodity, and determining the second unshelving information and the second shelving position information as first position change information of the second to-be-adjusted commodities.

Optionally, the step of determining second position change information of the second commodities and the third commodities according to the original position information of the second commodities, the standard position information of the third commodities, and the first position change information comprises:
acquiring a commodity change order of the first commodities after the positions of the first commodities are adjusted according to the first position change information;
determining a second commodity arrangement result corresponding to the second commodities according to the commodity change order and the original position information of the second commodities;
generating third unshelving information of the second commodities;
determining third shelving information of the third commodities according to the second commodity arrangement result and the standard position information corresponding to the third commodities; and
determining the third unshelving information and the third shelving information as the second position change information of the second commodities and the third commodities.

Optionally, the step of determining third shelving information of the third commodities according to the second commodity arrangement result and the standard position information corresponding to the third commodities comprises:
performing position comparison on the standard position information of the third commodities and the second commodity arrangement result; and
determining a to-be-shelved commodity corresponding to the third shelving information and a shelving position corresponding to the to-be-shelved commodity according to a position comparison result.

A commodity sorting method, being applied to a commodity sorting terminal, and comprising:
receiving first position change information and second position change information, corresponding to a to-be-tidied shelf, sent from a server; and
sorting commodities on the to-be-tidied shelf according to the first position change information and the second position change information.

Optionally, the step of sorting commodities on the to-be-tidied shelf according to the first position change information and the second position change information comprises:
adjusting positions of first commodities on the to-be-tidied shelf according to the first position change information; and
taking second commodities down from the to-be-tidied shelf according to the second position change information, and placing third commodities to designated positions on the to-be-tidied shelf.

Optionally, after the step of sorting commodities on the to-be-tidied shelf according to the first position change information and the second position change information, the method further comprises:
acquiring a degree of completion of commodity sorting of the to-be-tidied shelf; and
generating feedback information corresponding to the degree of completion of commodity sorting according to the degree of completion of commodity sorting, and uploading the feedback information to the server.

Optionally, the step of acquiring a degree of completion of commodity sorting of the to-be-tidied shelf comprises:
comparing all the commodities on the to-be-tidied shelf with standard commodity arrangement information to obtain a comparison result; and
determining the degree of completion of commodity sorting according to the comparison result.

A server terminal for commodity change information generation, comprising:
a processor, and
a memory storing computer-readable code, wherein when the computer-readable code is executed by a processor, the server is made to perform operations comprising:
Optionally, acquiring original commodity arrangement information of a to-be-tidied shelf and standard commodity arrangement information corresponding to the to-be-tidied shelf, wherein the original commodity arrangement information comprises names and original position information of plurality of original commodities, and the standard commodity arrangement information comprises names and standard position information of plurality of standard commodities;

Optionally, acquiring identical commodities in the plurality of original commodities and the plurality of standard commodities and taking the identical commodities as first commodities Optionally, determining first position change information of the first commodities according to the original position information and standard position information of the first commodities;

Optionally, acquiring second commodities in the plurality of original commodities and third commodities in the plurality of standard commodities, wherein the second commodities, the third commodities and the first commodities are different; and Optionally, determining second position change information of the second commodities and the third commodities according to the original position information of the second commodities, the standard position information of the third commodities, and the first position change information;

wherein, commodity change information comprises the first position change information and the second position change information.

Optionally, the operation of determining first position change information of the first commodities according to the original position information and standard position information of the first commodities comprises:

comparing the original position information of the first commodities with the standard position information of the first commodities; and determining the first position change information of the first commodities according to a comparison result.

Optionally, the operation of determining the first position change information of the first commodities according to a comparison result comprises:

determining that positions of the first commodities are not changed when the original position information of the first commodities is identical with the standard position information of the first commodities, and taking the information indicating that the positions of the first commodities are not changed as the first position change information.

Optionally, the operation of determining the first position change information of the first commodities according to a comparison result. comprises:

sequentially arranging all the first commodities according to an arrangement order corresponding to the standard position information of all the first commodities when the original position information of the first commodities is different from the standard position information of the first commodities, to obtain a first commodity arrangement result; and determining position adjustment information of the first commodities according to the first commodity arrangement result, and taking the position adjustment information as the first position change information.

An apparatus for performing comprising:

a processor, and a memory storing computer-readable code, wherein when the computer-readable code is executed by a processor, the apparatus is made to perform operations comprising: receiving first position change information and second position change information, corresponding to a to-be-tidied shelf, sent from a server; and sorting commodities on the to-be-tidied shelf according to the first position change information and the second position change information.

Optionally, the operation of sorting commodities on the to-be-tidied shelf according to the first position change information and the second position change information comprises:

adjusting positions of first commodities on the to-be-tidied shelf according to the first position change information; and taking second commodities down from the to-be-tidied shelf according to the second position change information, and placing third commodities to designated positions on the to-be-tidied shelf.

Optionally, the operations further comprise:

acquiring a degree of completion of commodity sorting of the to-be-tidied shelf; and generating feedback information corresponding to the degree of completion of commodity sorting according to the degree of completion of commodity sorting, and uploading the feedback information to the server.

The aforesaid description is merely a brief summary of the technical solution of the disclosure. To allow those skilled in the art to gain a better understanding of the technical means of the disclosure so as to implement the disclosure according to the contents in the specification and to make the above and other purposes, features and advantages of the disclosure clearer, specific implementations of the disclosure are given below.

BRIEF DESCRIPTION OF THE DRAWINGS

To more clearly explain the technical solutions of the embodiments of the disclosure or related arts, drawings used for describing the embodiments of the disclosure or the related arts will be briefly introduced below. Obviously, the drawings in the following description only illustrate some embodiments of the disclosure, and those ordinarily skilled in the art can obtain other drawings according to the following ones without creative labor.

DETAILED DESCRIPTION

To clarify the above objectives, features and advantages of the disclosure, the disclosure will be described in further detail below in conjunction with the accompanying drawings and specific embodiments. Obviously, the embodiments in the following description are merely illustrative ones, and are not all possible ones of the disclosure. All other embodiments obtained by those ordinarily skilled in the art based on the following ones without creative labor should also fall within the protection scope of the disclosure.

Figure 1:
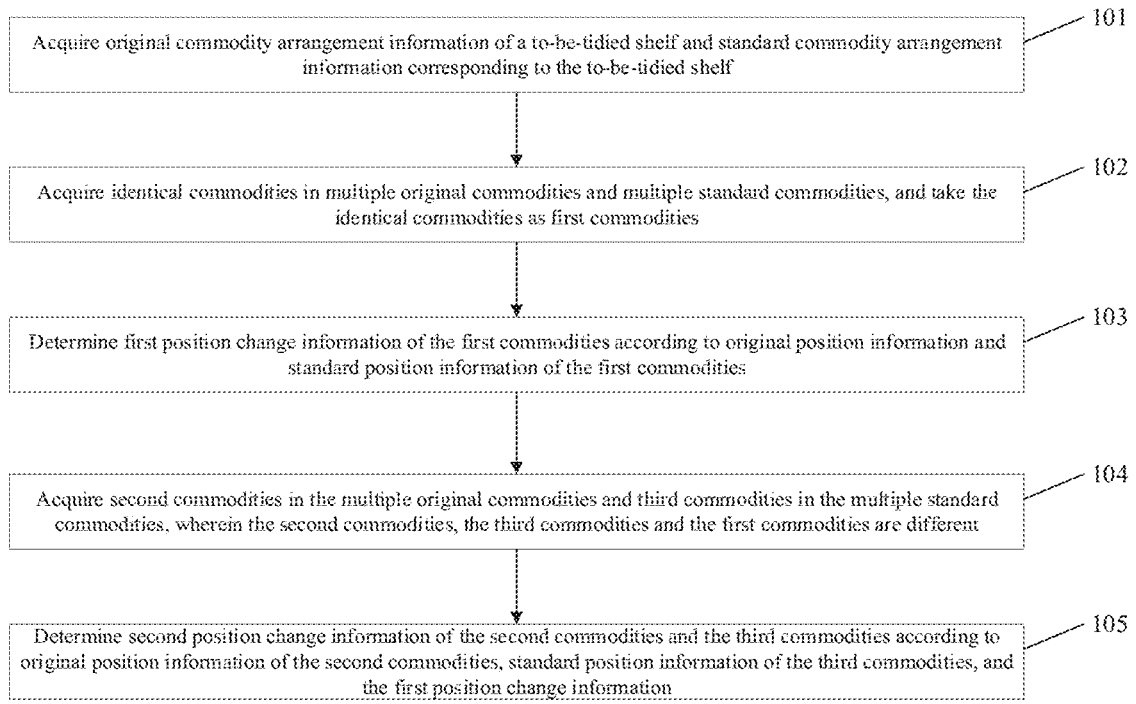
FIG. 1 illustrates a flow diagram of the steps of a commodity change information generation method according to one embodiment of the disclosure.

Referring to FIG. 1 which illustrates a flow diagram of the steps of a commodity change information generation method according to one embodiment of the disclosure, the commodity change information generation method may be applied to a service terminal, and may specifically comprise the following steps:

Step 101: original commodity arrangement information of a to-be-tidied shelf and standard commodity arrangement information corresponding to the to-be-tidied shelf are acquired.

This embodiment of the disclosure may be used for sorting commodities on shelves in shopping malls, supermarkets, or other places.

This embodiment will be described in detail below in conjunction with FIG. 2.

Figure 2:
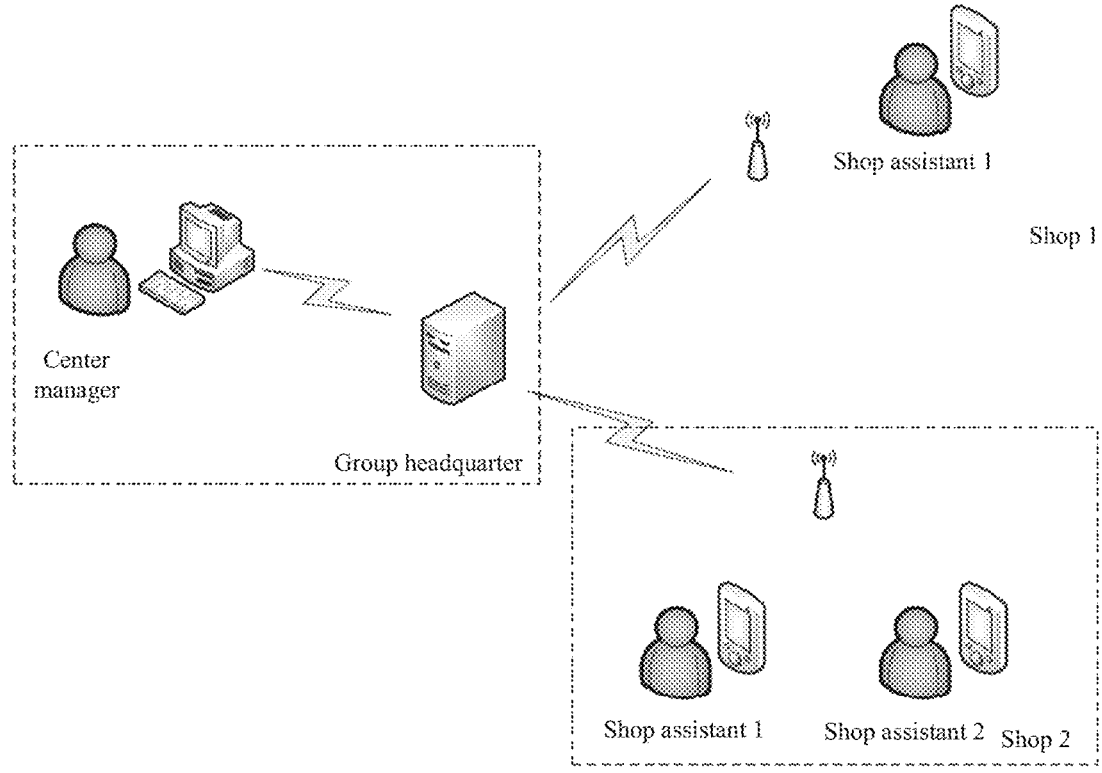
FIG. 2 illustrates a schematic diagram of a network structure according to one embodiment of the disclosure.

FIG. 2 illustrates a schematic diagram of a network structure according to one embodiment of the disclosure. As shown in FIG. 2, the network structure may comprise a terminal used by a center manager, a group headquarter, and a terminal used by shop assistants (commodity sorting terminal).

Figure 3:
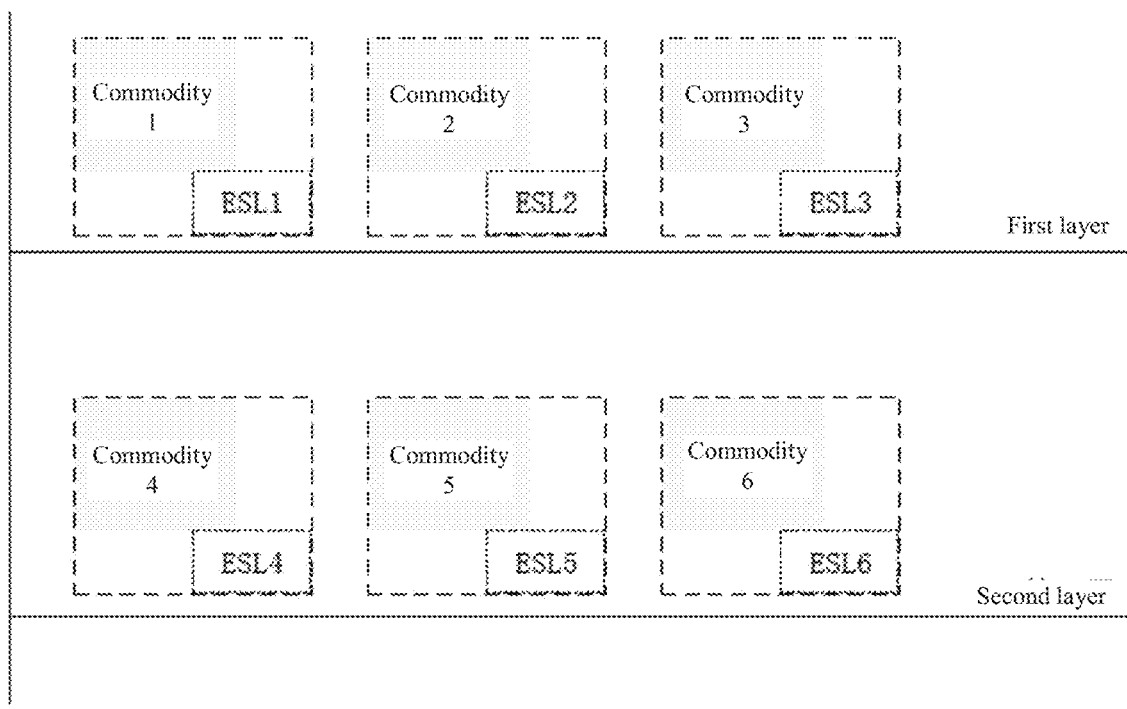
FIG. 3 illustrates a schematic diagram of a shelf structure according to one embodiment of the disclosure.

The original commodity arrangement information is information of commodities placed on the to-be-tidied shelf before commodity sorting, wherein the original commodity arrangement information includes multiple original commodities, names of the original commodities, and original position information of the multiple original commodities on the to-be-tidied shelf. For example, as shown in FIG. 3 which illustrates a schematic diagram of a shelf structure in one embodiment of the disclosure, commodity 1, commodity 2 and commodity 3 are placed on a first layer of a shelf, and commodity 4, commodity 5 and commodity 6 are placed on a second layer of the shelf.

The standard commodity arrangement information is standard information of commodities on the to-be-tidied shelf, wherein the standard commodity arrangement information includes names of multiple standard commodities and standard position information of the multiple standard commodities on the to-be-tidied shelf.

When the commodities on the to-be-tidied shelf need to be sorted, the original commodity arrangement information of the to-be-tidied shelf and the standard commodity arrangement information corresponding to the to-be-tidied shelf may be acquired.

Figure 5:
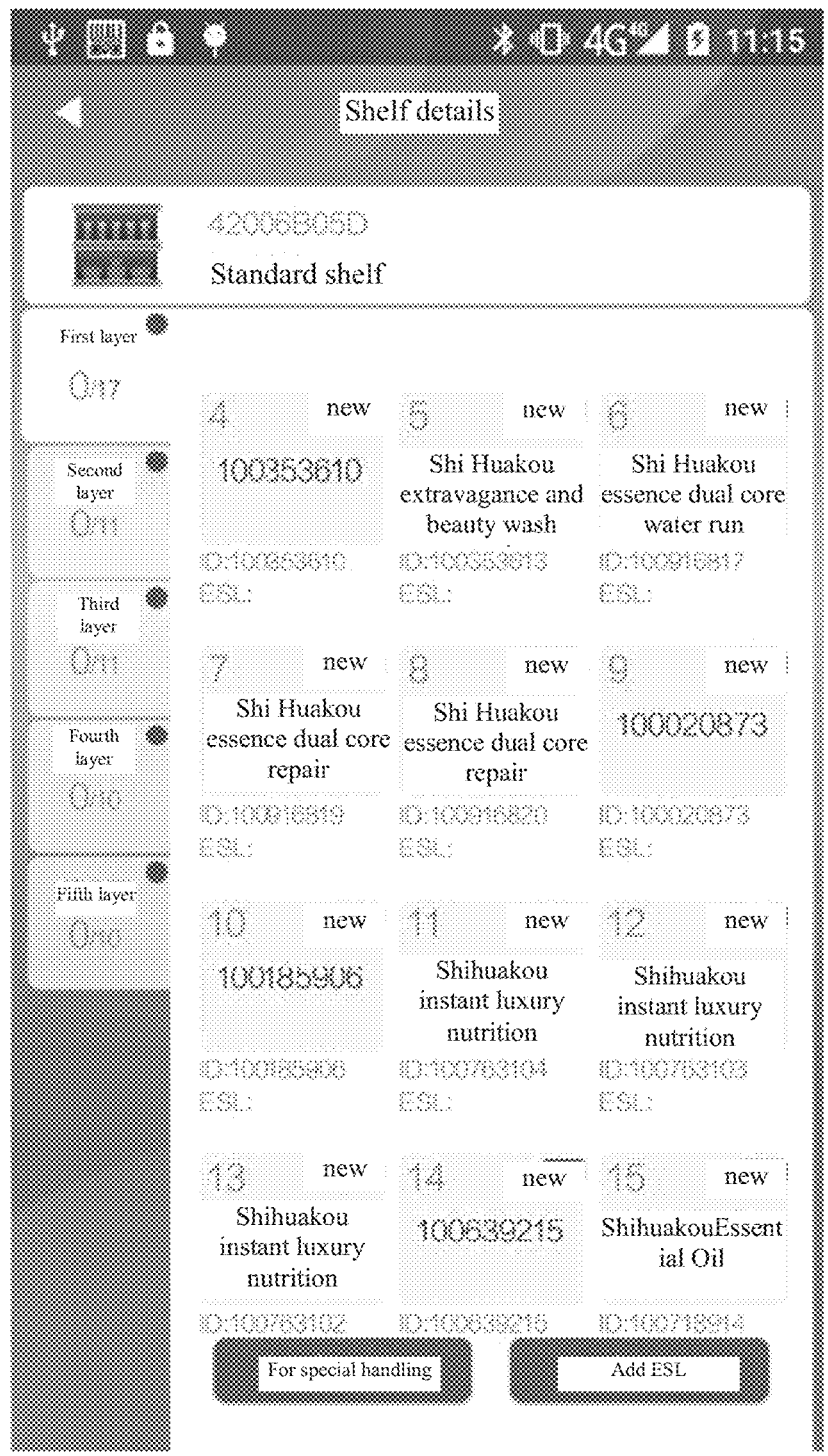
FIG. 5 illustrates a schematic diagram of commodity arrangement displayed by a PAD according to one embodiment of the disclosure.

The standard commodity arrangement information is pre-stored in a service terminal, and commodity standards corresponding to different types of shelves may be pre-stored in the service terminal. For example, as shown in FIG. 5 which illustrates a schematic diagram of commodity arrangement displayed by a PAD, commodities that should be placed on the first layer of the shelf comprise commodities at position 4, position 5, . . . , and position 15. For example, a commodity with an ID 100353610 should be placed at position 4, and a commodity with an ID 100353613 should be placed at position 5.

It may be understood that the above example is provided merely for a better understanding of the technical solution of this embodiment of the disclosure and should not be construed as the unique implementation of this embodiment of the disclosure.

The original commodity arrangement information may be acquired as follows: the original commodity arrangement information of the to-be-tidied shelf is acquired according to a commodity layout corresponding to the to-be-tidied shelf. Specifically, the commodity layout corresponding to the to-be-tidied shelf may be acquired by means of a camera device (such as a surveillance camera) prearranged in a large public place such as a shopping mall or a supermarket and is then recognized to obtain the commodity arrangement information of the to-be-tidied shelf, such as commodities placed on the to-be-tidied shelf and the position of each commodity on the to-be-tidied shelf.

Of course, in a specific implementation, the commodity arrangement information of the to-be-tidied shelf may also be acquired in other ways. For example, management staff in a shopping mall or a supermarket manually inputs original commodity arrangement information of commodities on the shelf and sends the original commodity arrangement information to the service terminal. The specific way for acquiring the commodity arrangement information of the to-be-tidied shelf depends on business requirements, and this embodiment of the disclosure has no limitation in this aspect.

After the original commodity arrangement information of the to-be-tidied shelf and the standard commodity arrangement information corresponding to the to-be-tidied shelf are acquired, Step 102 is performed.

Step 102: identical commodities in the multiple original commodities and the multiple standard commodities are acquired to be taken as first commodities.

The first commodities are identical commodities both in the multiple original commodities and in the multiple standard commodities. For example, the multiple original commodities may comprise commodity a, commodity b, and commodity c, and the multiple standard commodities may comprise commodity c, commodity d, commodity a, and commodity e, so the first commodities are commodity c and commodity a.

It may be understood that the above example is provided merely for a better understanding of the technical solution of this embodiment of the disclosure and should not be construed as the unique implementation of this embodiment of the disclosure.

After the original commodity arrangement information of the to-be-tidied shelf and the standard commodity arrangement information corresponding to the to-be-tidied shelf are acquired, the multiple original commodities in the original commodity arrangement information may be compared with the multiple standard commodities in the standard commodity arrangement information one by one to determine the first commodities in the multiple original commodities and the multiple standard commodities.

After the identical commodities in the multiple original commodities and the multiple standard commodities are acquired to be taken as the first commodities, Step 103 is performed.

Step 103: first position change information of the first commodities is determined according to the original position information and standard position information of the first commodities.

The first position change information is information indicating that the positions of the first commodities need to be changed, but the first commodities do not need to be taken down from the shelf. For example, the first commodities may comprise commodity a and commodity b, commodity a is located at the second position in the first line of the to-be-tidied shelf and commodity b is located at the second position of the second line of the to-be-tidied shelf before commodity sorting, while according to the standard commodity arrangement rule, commodity a needs to be adjusted to the first position in the second line and commodity b needs to be adjusted to the fourth position in the second line, and such position change information is the first position change information.

It may be understood that the above example is provided merely for a better understanding of the technical solution of this embodiment of the disclosure and should not be construed as the unique implementation of this embodiment of the disclosure.

After the first commodities in the multiple original commodities and the first commodities in the multiple standard commodities are acquired, the original position information of the first commodities may be compared with the standard position information of the corresponding first commodities to determine the first position change information of the first commodities, which will be described in detail below in conjunction with a specific implementation.

In one specific implementation of the disclosure, Step 102 may comprise:

Sub-step A1: the original position information of the first commodities is compared with the standard position information of the first commodities.

In this embodiment of the disclosure, after the first commodities are acquired, the original position information of the first commodities may be compared with the standard position information of the first commodities to obtain a corresponding comparison result. For example, the multiple original commodities may be the following set (1), and the multiple standard commodities may be the following set (2):

$$A_1 = \{a_1, a_2, a_3, a_4, a_5, a_6, a_7, a_8, a_9, a_{10}\} \quad (1)$$

$$B_1 = \{b_1, b_2, b_3, b_4, b_5, b_6, b_7, b_8, b_9, b_{10}\} \quad (2)$$

Wherein, $a_1 = b_5$, $a_6 = b_3$, $a_8 = b_9$ that is to say, the first commodities in the multiple original commodities is $a_1$, $a_6$ and $a_8$, the first commodities in the multiple standard commodities are $b_5$, $b_3$ and $b_9$, in this case, the position information of $a_1$ may be compared with the position information of $b_5$, the position information of $a_6$ may be compared with the position information of $b_3$, and the position information of $a_8$ may be compared with the position information of $b_9$, such that a corresponding comparison result is obtained.

It may be understood that the above example is provided merely for a better understanding of the technical solution of this embodiment of the disclosure and should not be construed as the unique implementation of this embodiment of the disclosure.

After the original position information of the first commodities is compared with the standard position information of the first commodities, Sub-step A2 is performed.

Sub-step A2: first position change information of the first commodities is determined according to a comparison result.

After the original position information of the first commodities is compared with the standard position information of the first commodities, the first position change information of the first commodities may be determined according to the comparison result of the original position information of the first commodities and the standard position information of the first commodities.

The specific solution for determining the first position change information according to the comparison result will be described in detail below in conjunction with the following specific implementation.

In another specific implementation of the disclosure, Sub-step A2 may comprise:

Sub-step A21: when the original position information of the first commodities is identical with the standard position information of the first commodities, it is determined that the positions of the first commodities are not changed, and the information indicating that the positions of the first commodities are not changed is taken as the first position change information In this embodiment of the disclosure, when the original position information of the first commodities is identical with the standard position information of the first commodities, the positions of the first commodities on the to-be-tidied shelf do not need to be changed, so it is determined that the positions of the first commodities are not changed, and the information indicating that the positions of the first commodities are not changed is taken as the first position change information.

The case where the original position information of the first commodities is different from the standard position information of the first commodities will be described in detail below in conjunction with the following specific implementation.

In another specific implementation of the disclosure, Sub-step A2 may comprise:

Sub-step A22: when the original position information of the first commodities is different from the standard position information of the first commodities, all the first commodities are sequentially arranged according to an arrangement order corresponding to the standard position information of all the first commodities to obtain a first commodity arrangement result.

In this embodiment of the disclosure, when the original position information of the first commodities is different from the standard position information of the first commodities, all the first commodities may be sequentially arranged according to the arrangement order corresponding to the standard positions of the first commodities to obtain the first commodity arrangement result. For example, if a standard commodity arrangement order corresponding to the to-be-tidied shelf is: $b_1, b_2, b_3, b_4, b_5, b_6, b_7, b_8, b_9$ and $b_{10}$, the first arrangement result of the first commodities is: $b_1, b_2, b_3, b_4, b_5, b_6, b_7, b_8, b_9$ and $b_{10}$, that is, the first commodities are sequentially arranged according to the arrangement positions of the commodities on the to-be-tidied shelf.

After all the first commodities are sequentially arranged according to the arrangement order corresponding to the standard position information of all the first commodities to obtain the first commodity arrangement result, Sub-step A23 is performed.

Sub-step A23: position adjustment information of the first commodities is determined according to the first commodity arrangement result and is taken as the first position change information.

After the first arrangement result corresponding to all the first commodities is obtained, the position adjustment information of the first commodities may be determined according to the first arrangement result and be taken as the first position change information of the first commodities. A detailed description of this sub-step will be given below in conjunction with the following specific implementation.

In another specific implementation of the disclosure, Sub-step A23 may comprise:

Sub-step A231: a to-be-changed commodity in the first commodities is determined according to the first commodity arrangement result.

It may be understood that when the number of the to-be-changed commodities is greater than or equal to two, a first to-be-adjusted commodity and second to-be-adjusted commodities in the to-be-adjusted commodities may be determined according to the original position information of the to-be-changed commodities after the to-be-changed commodities are acquired.

In this embodiment of the disclosure, the first to-be-adjusted commodity is a commodity ranked first after all the first commodities are sequentially arranged according to the arrangement order corresponding to the to-be-tidies shelf.

The second to-be-adjusted commodities are commodities located behind the commodity ranked first after all the first commodities are sequentially arranged according to the arrangement order corresponding to the to-be-tidies shelf. For example, if the arrangement order of the first commodities on the to-be-tidied shelf is: A, B, C, D and E, A ranked first may be regarded as the first to-be-adjusted commodity, and B, C and D located behind A may be regarded as the second to-be-adjusted commodities.

After the first commodity arrangement result is acquired, the first to-be-adjusted commodity and the second to-be-adjusted commodities may be determined according to the first commodity arrangement result, which will be described in detail below in conjunction with the following specific implementation.

In this embodiment of the disclosure, the to-be-changed commodities are identical commodities, the positions of which need to be adjusted, in the first commodities on the to-be-tidied shelf.

After the first commodity arrangement result is acquired, the to-be-changed commodities in the first commodities may be determined according to the first commodity arrangement result. For example, the multiple original commodities may be the following set (1), and the multiple standard commodities may be the following set (2):

$$A_1 = \{a_1, a_2, a_3, a_4, a_5, a_6, a_7, a_8, a_9, a_{10}\} \quad (1)$$

$$B_1 = \{b_1, b_2, b_3, b_4, b_5, b_6, b_7, b_8, b_9, b_{10}\} \quad (2)$$

Wherein, $a_1 = b_5$, $a_6 = b_3$, $a_8 = b_9$, that is to say, the first commodities in the multiple original commodities are $a_1$, $a_6$ and $a_8$, and the first commodities in the multiple standard commodities are $b_5$, $b_3$ and $b_9$; in the case, the original positions of the first commodities are different from the standard positions of the first commodities, so the first commodities $a_1$, $a_6$ and $a_8$ may be regarded as to-be-changed commodities, the positions of which need to be changed.

It may be understood that the above example is provided merely for a better understanding of the technical solution of this embodiment of the disclosure and should not be construed as the unique implementation of this embodiment of the disclosure.

After the to-be-changed commodity in the first commodities is determined, Sub-step A232 is performed.

Sub-step A232: unshelving information of the to-be-changed commodity is determined according to the original position information of the to-be-changed commodity.

In this embodiment of the disclosure, when the number of the to-be-changed commodities is greater than or equal to 2, first unshelving information of the first to-be-adjusted commodity is generated according to the original position information of the first to-be-adjusted commodity, and first shelving position information of the first to-be-adjusted commodity is determined according to the standard position information of the first to-be-adjusted commodity.

The first unshelving information is unshelving information of the first to-be-adjusted commodity, that is, the first unshelving information may indicate unshelving of the first to-be-adjusted commodity.

Figure 4:
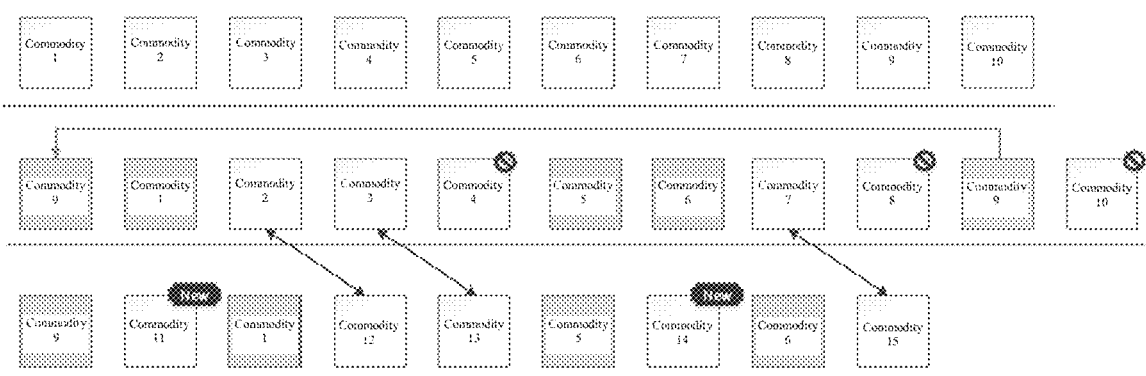
FIG. 4 illustrates a schematic diagram of an algorithm for basic operations of commodity change on a service terminal according to one embodiment of the disclosure.

For example, referring to FIG. 4 in which the commodity position adjustment information is shown by the single-headed arrow, as shown in the second line, commodity 9 is taken down from the shelf and is then placed to the first position in the second line of the shelf. For another example, the first commodities in a commodity set $A_1 = \{a_1, a_2, a_3, a_4, a_5, a_6, a_7, a_8, a_9, a_{10}\}$ on the to-be-tidied shelf are sequentially $a_1$, $a_6$ and $a_8$, wherein the first to-be-adjusted commodity in the first commodities is $a_1$, and the second to-be-adjusted commodities are $a_6$ and $a_8$; the positions of $a_6$ and $a_8$ are kept unchanged, the position of $a_1$ is adjusted first; after the position of $a_1$ is adjusted, the to-be-adjusted commodities in the first commodities are $a_6$ and $a_8$, wherein the first to-be-adjusted commodity is $a_6$, and the second to-be-adjusted commodity is $a_8$; then, the position of $a_8$ is kept unchanged, and the position of $a_6$ is adjusted; and finally, the position of $a_8$ is adjusted.

It may be understood that the above example is provided merely for a better understanding of the technical solution of this embodiment of the disclosure and should not be construed as the unique implementation of this embodiment of the disclosure.

After the first unshelving information of the first to-be-adjusted commodity is generated according to the original position information of the first to-be-adjusted commodity and the first shelving position information of the first to-be-adjusted commodity is determined according to the standard position information of the first to-be-adjusted commodity, Sub-step A233 is performed. Sub-step A233: shelving information of the to-be-changed commodity is generated according to the standard position information of the to-be-changed commodity.

Second unshelving information is unshelving information corresponding to the second to-be-adjusted commodities, that is, the second unshelving information may indicate unshelving of the second to-be-adjusted commodities.

Second shelving position information is accurate shelving position information of the second to-be-adjusted commodities on the to-be-tidied shelf.

After the position of the first to-be-adjusted commodity is adjusted, the second unshelving information of the second to-be-adjusted commodities is generated by keeping the position of the first to-be-adjusted commodity unchanged, and the second shelving position information of the second to-be-adjusted commodities is determined according to commodities, corresponding to the second to-be-adjusted commodities, in the first commodities, that is, the standard position information of the commodities, identical with the second to-be-adjusted commodities, in the first commodities is determined as the second shelving position information of the second to-be-adjusted commodities.

After the second unshelving information of the second to-be-adjusted commodities is generated by keeping the position of the first to-be-adjusted commodity is unchanged, and the second shelving position information of the second to-be-adjusted commodities is determined according to the commodities, corresponding to the second to-be-adjusted commodities, in the first commodities, Sub-step A234 is performed.

Sub-step A234: the unshelving information and the shelving information are determined as the first position change information of the to-be-changed commodity.

In this embodiment of the disclosure, when the number of the to-be-changed commodities is greater than or equal to 2, the first unshelving information and the first shelving position information may be determined as the first position change information of the first to-be-adjusted commodity, and the second unshelving information and the second shelving position information may be determined as the first position change information of the second to-be-adjusted commodities.

After the first unshelving information and the first shelving position information of the first to-be-adjusted commodity are acquired, the first unshelving information and the first shelving position information may be taken as the first position change information of the first to-be-adjusted commodity.

After the second unshelving information and the second shelving position information of the second to-be-adjusted commodities are acquired, the second unshelving information and the second shelving position information may be taken as the second position change information of the second to-be-adjusted commodities.

After the first position change information of the first commodities is determined according to the original position information of the first commodities and the standard position information of the first commodities, Step 104 is performed.

Step 104: second commodities in the multiple original commodities and third commodities in the multiple standard commodities are acquired, wherein the second commodities, the third commodities and the first commodities are different.

The second commodities and the third commodities are commodities, different from the identical commodities, in the multiple original commodities and the multiple standard commodities. In the above example, the second commodity is commodity b in the multiple original commodities, and the third commodities are commodity d and commodity c in the multiple standard commodities.

It may be understood that the above example is provided merely for a better understanding of the technical solution of this embodiment of the disclosure and should not be construed as the unique implementation of this embodiment of the disclosure.

After the original commodity arrangement information of the to-be-tidied shelf and the standard commodity arrangement information corresponding to the to-be-tidied shelf are acquired, the multiple original commodities in the original commodity arrangement information may be compared with the multiple standard commodities in the standard commodity arrangement information one by one to determine the second commodities in the multiple original commodities and the third commodities in the multiple standard commodities.

Step 105: second position change information of the second commodities and the third commodities is determined according to the original position information of the second commodities, the standard position information of the third commodities, and the first position change information.

The second position change information is position change information of the second commodities and the third commodities.

It may be understood that the second commodities on the to-be-tidied shelf are different from commodities in the standard commodity arrangement information corresponding to the to-be-tidied shelf, so the second commodities need to be taken down from the shelf, and the commodities in the corresponding standard commodity arrangement information need to be placed on the shelf, that is, the unshelving information of the second commodities, to-be-shelved commodities corresponding to the standard commodity arrangement information, and the shelving position information of the to-be-shelved commodities constitute the second position change information of the second commodities.

After the second commodities in the original commodities on the to-be-tidied shelf and the third commodities in the standard commodity arrangement information corresponding to the to-be-tidied shelf are obtained, the second position change information of the second commodities may be determined according to the original position information of the second commodities, the standard position information of the third commodities, and the first position change information, which will be described in detail below in conjunction with the following specific implementation.

In another specific implementation of the disclosure, Step 105 may comprise:

Sub-step B1: a commodity change order of the first commodities is acquired after the positions of the first commodities are adjusted according to the first position change information.

In this embodiment of the disclosure, the commodity change order is a new arrangement order of the first commodities after the positions of the first commodities are adjusted. For example, the first commodities in the commodity set $A_1=\{a_1, a_2, a_3, a_4, a_4, a_6, a_7, a_8, a_9, a_{10}\}$ on the to-be-tidied shelf are sequentially $a_1$, $a_6$ and $a_8$, and a new commodity arrangement order obtained after the first commodities are adjusted according to standard positions of the first commodities is $a_6$, $a_1$ and $a_8$, and this new commodity arrangement order is the commodity change order.

It may be understood that the above example is provided merely for a better understanding of the technical solution of this embodiment of the disclosure and should not be construed as the unique implementation of this embodiment of the disclosure.

The commodity change order of the first commodities may be acquired after the positions of the first commodities are adjusted according to the first position change information, and then Sub-step B2 is performed.

Sub-step B2: a second commodity arrangement result corresponding to the second commodities is determined according to the commodity change order and the original position information of the second commodities.

The second commodity arrangement result is an arrangement result obtained after the second commodities are sorted according to the commodity change order of the first commodities and the original position information of the second commodities. For example, a new set obtained after the positions of the first commodities in $A_1=\{a_1,a_2,a_3,a_4,a_5,a_6,a_7,a_8, a_9, a_{10}\}$ are adjusted is $A_2=\{C_1,a_6,C_2,a_1,C_3,a_8,C_4\}$, that is, $a_1$, $a_6$ and $a_8$ are adjusted according to the positions of the first commodities, and in this case, $C_1=\{a_2,a_3\}$, $C_2=\{a_4,a_5\}$, $C_3=\{a_6,a_7\}$ and $C_4=\{a_9,a_{10}\}$, so the arrangement result of the second commodities is $C_1=\{a_2,a_3\}$, $C_2=\{a_4, a_5\}$, $C_3=\{a_6, a_7\}$ and $C_4=\{a_9,a_{10}\}$, and the first commodities having their positions being adjusted exist between $C_1$, $C_2$, $C_3$ and $C_4$.

After the commodity change order of the first commodities is acquired, the second commodity arrangement result corresponding to the second commodities, namely the positions corresponding to $C_1$, $C_2$, $C_3$ and $C_4$, as well as the second commodities in the above embodiment, may be determined according to the commodity change order and the original position information of the second commodities.

After the second commodity arrangement result is acquired, Sub-step B3 is performed.

Sub-step B3: third unshelving information of the second commodities is generated.

The third unshelving information is unshelving information of the second commodities, that is, the third unshelving information may indicate that all the second commodities need to be taken down from the to-be-tidied shelf.

The third unshelving information of all the second commodities may be generated after all the second commodities are acquired. For example, if $C_1$ includes $a_2$ and $a_3$, commodities $a_2$ and $a_3$ need to be taken down from the shelf.

Sub-step B4: third shelving information of the third commodities is determined according to the second commodity arrangement result and the standard position information corresponding to the third commodities A to-be-shelved commodity is a commodity to be placed on the to-be-tidied shelf after the second commodities are taken down from the to-be-tidied shelf.

A shelving position is an accurate position where the to-be-shelved commodity is located on the to-be-tidied shelf.

After the second commodity arrangement result is obtained, the second commodity arrangement result may be compared with the standard position information corresponding to the third commodities, and a to-be-shelved commodity in the third commodities and a shelving position corresponding to the to-be-shelved commodity are determined according to a comparison result.

Specifically, after the positions of the first commodities are determined, the to-be-shelved commodity and the shelving position are determined according to the standard positions corresponding to the third commodities, which will be described in detail below in conjunction with the following specific implementation.

In a specific implementation of the disclosure, Sub-step B4 may comprise:

Sub-step B41: position comparison is performed on the standard position information of the third commodities and the second commodity arrangement result.

Sub-step B42: a to-be-shelved commodity corresponding to the third shelving information and a shelving position corresponding to the to-be-shelved commodity are determined according to a position comparison result.

In this embodiment of the disclosure, the second commodity arrangement result corresponding to the second commodities may be obtained after the positions of the first commodities are adjusted according to the standard positions of the first commodities, then position comparison is performed on the standard position information corresponding to the third commodities and the second commodity arrangement result, and the to-be-shelved commodity in the third commodities and the shelving position corresponding to the to-be-shelved commodity are determined according to a position comparison result. For example, the first commodity 1, $a_6$ and $a_8$ in $A_1=\{a_1,a_2,a_3,a_4,a_5,a_6,a_7,a_8,a_9,a_{10}\}$ are arranged according to the standard positions of $b_5$, $b_3$ and $b_9$ in $B_1=\{b_1,b_2,b_3,b_4,b_5,b_6,b_7,b_8,b_9,b_{10}\}$ to obtain the commodity sets: $A_2=\{C_1,a_6,C_2,a_1, C_3,a_8,C_4\}$ and $B_2=\{D_1b_1,b_3, D_2,b_5,D_3,b_9,D_4\}$. Wherein, $C_1=\{a_2,a_3\}$, $C_2=\{a_4,a_5\}$, $C_3=\{a_6, a_7\}$, $C_4=\{a_9,a_{10}\}$, $D_1=\{b_1,b_2\}$, $D_2=\{b_4\}$, $D_3=\{b_6,b_7,b_8\}$ and $D_4=\{b_{10}\}$.

First, $C_1$ and $D_1$ are compared to obtain the to-be-shelved commodities $b_1$ and $b_2$, and shelving positions of the to-be-shelved commodities $b_1$ and $b_2$ are determined according to the standard positions of $b_1$ and $b_2$ and the original positions of $a_2$ and $a_3$. Specifically, the shelving position of b1 is before a6, and the shelving position of b2 is between b1 and a6. Then, $C_2$ and $D_2$ are compared to obtain the to-be-shelved commodity $b_4$, and then the shelving position of the to-be-shelved commodity $b_4$ is determined according to the standard position of $b_4$ and the original positions of $a_4$ and $a_5$. Next, $C_3$ and $D_3$ are compared to obtain the to-be-shelved commodities $b_6$, $b_7$ and $b_8$, and shelving positions of the to-be-shelved commodities $b_6$, $b_7$ and $b_8$ are determined according to the standard positions of $b_6$, $b_7$ and $b_8$, as well as the original positions of $a_6$ and $a_7$. Finally, $C_4$ and $D_4$ are compared to obtain the to-be-shelved commodity $b_{10}$, and the shelving position of the to-be-shelved commodity $b_{10}$ is determined according to the standard position of $b_{10}$ and the original position of $a_9$ and $a_{10}$.

It may be understood that the above example is provided merely for a better understanding of the technical solution of this embodiment of the disclosure and should not be construed as the unique implementation of this embodiment of the disclosure.

After the to-be-shelved commodity in the third commodities and the shelving position corresponding to the to-be-shelved commodity are determined according to the second commodity arrangement result, Sub-step B5 is performed.

Sub-step B5: the third unshelving information and the third shelving information are determined as the second position change information of the second commodities and the third commodities.

After the third unshelving information and the third shelving information (including the to-be-shelved commodity and the shelving position) of the second commodities are acquired, the third unshelving information, the to-be-shelved commodity and the third shelving position information may be determined as the second position change information of the second commodities. For example, a new set obtained after the positions of the first commodities in $A_1=\{a_1,a_2,a_3,a_4,a_5,a_6,a_7,a_8,a_9,a_{10}\}$ are adjusted is:

$$A_2=\{C_1,a_6,C_2,a_1,C_3,a_8,C_4\}=\{a_2,a_3,a_4,a_5,a_6,a_1,a_7,a_8,a_9,a_{10}\}$$

That is, $a_1$, $a_6$ and $a_8$ are adjusted according to the positions of the first commodities, and at this moment, $C_1=\{a_2,a_3,a_4,a_5\}$, $C_2$ is empty, $C_3=\{a_7\}$, and $C_4=\{a_9\ a_{10}\}$. Of course, other adjustment methods except for this one can also be adopted, but this method is convenient because the positions of $a_6$ and $a_8$ do not need to be adjusted after $a_1$ is adjusted to the position of $a_6$. Or, it is also feasible to adjust $a_6$ before $a_1$, or to adjust the positions of $a_1$, $a_6$ and $a_8$. The specific adjustment method depends on actual circumstances, and this embodiment has no limitation in this aspect.

In case of $C_1=\{a_2,a_3\}$ $C_2=\{a_4,a_5\}$, $C_3=\{a_6,a_7\}$ and $C_4=\{a_9,a_{10}\}$, unshelving information of $C_1=\{a_2,a_3\}$ may be generated, to-be-shelved commodities to be placed to two positions before $a_6$ are $b_1$ and $b_2$, and the unshelving information of $C_1=\{a_2,a_3\}$, the to-be-shelved commodities $b_1$ and $b_2$, and the positions of a2 and a3 in C1 corresponding to $b_1$ and $b_2$ may be determined as the second position change information. Of course, in actual application, if other to-be-unshelved commodities, that do not have corresponding arrangement positions, exist in the identical commodities after the positions of the first commodities are adjusted, unshelving information of these to-be-unshelved commodities may be generated to be used as the second position change information.

The solution provided by this embodiment of the solution will be described in detail below in conjunction with the following set.

For example, the multiple original commodities may be the following set (1), and the multiple standard commodities may be the following set (2):

$$A_1=\{a_1,a_2,a_3,a_4,a_5,a_6,a_7,a_8,a_9,a_{10}\} \quad (1)$$

$$B_1=\{b_1,b_2,b_3,b_4,b_5,b_6,b_7,b_8,b_9,b_{10}\} \quad (2)$$

Wherein, $a_1=b_5$, $a_6=b_3$, $a_8=b_9$ so identical commodities constitute the corresponding sets:

$A'_1=\{a_1,a_6,a_8\}$ and $B'_1=\{b_5,b_3,b_9\}$.

Next, the longest ordered sub-set $B''_1=\{b_3,b_9\}$ is searched out from $B'_1$ when elements in $B'_1$ are sorted according to $B_1$ order.

Then, remaining elements in $B'_1$ are incorporated in an ordered sub-set $B''_1$ to obtain a new ordered sub-set: $B''_1=\{b_3,b_5,b_9\}$.

The new ordered sub-set determines elements, the positions of which need to be changed.

After the identical commodities on the to-be-tidied shelf are rearranged arranged to the positions of the standard commodities, a new order is obtained:

$$A_2=\{C_1,a_6,C_2,a_1,C_3,a_8,C_4\}=\{a_2,a_3,a_6,a_4,a_5,a_1,a_7,a_8,a_9,a_{10}\}$$

A newt order of the standard commodity set is:

$$B_2=\{D_1,b_3,D_2,b_5,D_3,b_9,D_4\}=\{b_1,b_2,b_3,b_4,b_5,b_6,b_7,b_8,b_9,b_{10}\}$$

Wherein, $C_1$, $C_2$, $C_3$ and $C_4$ represent sets formed by the second commodities located between the identical commodities after the positions of the first commodities are adjusted, namely sets that are formed after the positions of $a_1$, $a_6$ and $a_8$ are adjusted according to the positions of $b_5$, $b_3$ and $b_9$, wherein $C_1$ represents a set constituted by commodities before $a_6$, and when $a_6$ is adjusted to the standard position corresponding to $b_3$, $a_3$ is moved leftwards, and at this moment, $C_1=\{a_2,a_3\}$; $C_2$ represents a set constituted by commodities between $a_6$ and $a_1$, $a_5$ is moved leftwards when $a_1$ is adjusted to the standard position corresponding to $b_5$, and at this moment, $C_2=\{a_4,a_5\}$; $C_3$ represents a set constituted by commodities between $a_1$ and $a_8$, $a_9$ is moved rightwards when $a_8$ is adjusted to the standard position corresponding to $b_9$, and at this moment, $C_3=\{a_7\}$; $C_4$ represents a set constituted by commodities behind $a_8$, $a_9$ is moved rightwards when $a_8$ is adjusted to the standard position corresponding to $b_9$, and at this moment, $C_4=\{a_9,a_{10}\}$.

$D_1$, $D_2$, $D_3$ and $D_4$ are sets constituted by third commodities located between the first commodities, before the first commodities and behind the first commodities, wherein R represents a set constituted by $b_1$ and $b_2$ before $b_3$, that is, $D_1=\{b_1,b_2\}$; $D_2$ represents a set constituted by $b_4$ between $b_3$ and $b_5$, that is, $D_2=\{b_4\}$; $D_3$ represents a set constituted by $b_6$, $b_7$ and $b_8$ between $b_5$ and $b_9$, that is $D_3=\{b_6,b_7,b_8\}$; and $D_4$ represents a set constituted by $b_{10}$ behind $b_9$, that is, $D_4=\{b_{10}\}$.

The specific adjustment process will be described in detail in the following embodiment with reference to FIG. 4, and will no longer be detailed in this embodiment of the disclosure.

Figure 6:
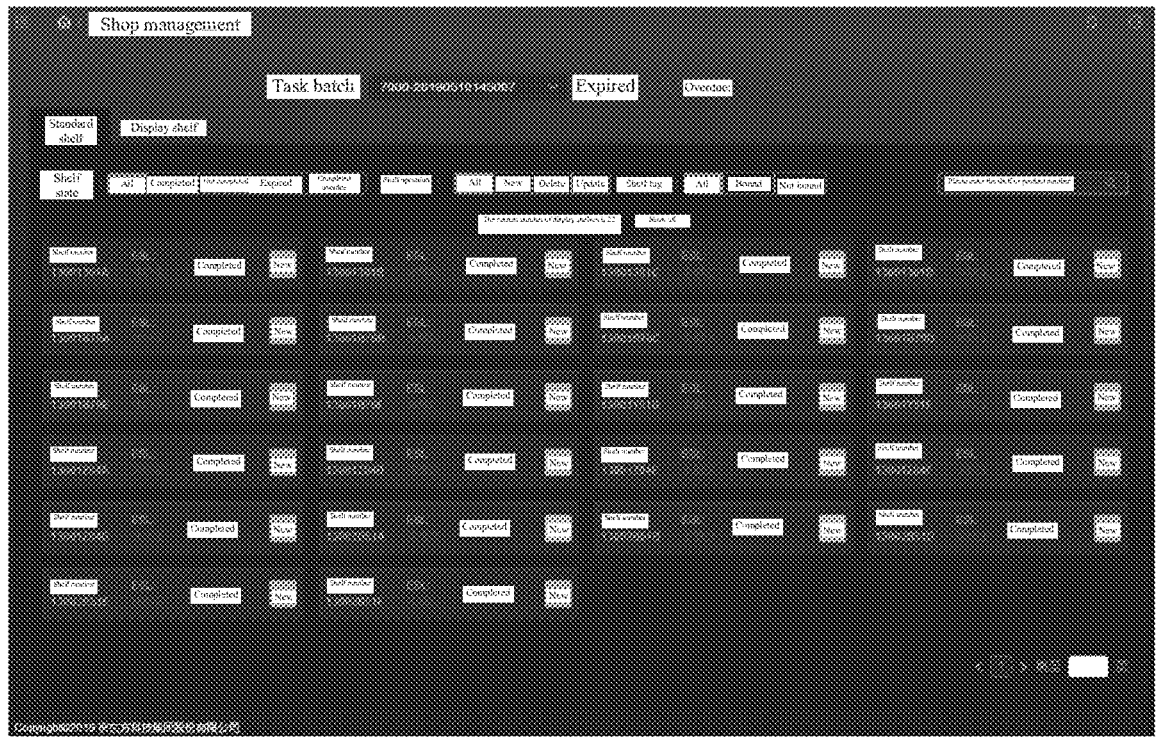
FIG. 6 illustrates a schematic diagram of actual exhibition of backstage management of a system according to one embodiment of the disclosure.

In this embodiment of the disclosure, management of shelves may be realized backstage. For example, as shown in FIG. 6 which illustrates a schematic diagram of actual exhibition of backstage management of a system, task batches may be numbered in the backstage management interface, such as a task batch: 7000-20190510145007. After the serial numbers of the task batches are input, the serial number of each shelf will be displayed, and then a commodity sorting result, such as "completed" or "non-completed", corresponding to the serial number of each shelf will be displayed in the interface.

According to the commodity change information generation method in this embodiment of the disclosure, the original commodity arrangement information of the to-be-tidied shelf and the standard commodity arrangement information corresponding to the to-be-tidied shelf are acquired, wherein the original commodity arrangement information includes names and original position information of multiple original commodities, and the standard commodity arrangement information includes names and standard position information of multiple standard commodities; the first commodities and second commodities in the multiple original commodities, as well as the first commodities and the third commodities in the multiple standard commodities are acquired, wherein the first commodities are identical commodities both in the multiple original commodities and in the multiple standard commodities, and the second commodities and the third commodities are commodities, different from the identical commodities, in the multiple original commodities and the multiple standard commodities; the first position change information of the first commodities is determined according to the original position information and standard position information of the first commodities; the second position change information of the second commodities is determined according to the original position information of the second commodities, the standard position information of the third commodities, and the first position change information, wherein the commodity change information includes the first position change information and the second position change information. According to this embodiment of the disclosure, the commodities on the to-be-tidied shelf are compared with standard commodities to generate position change information of the commodities originally placed on the shelf, and it is not necessary to take all the commodities down from the to-be-tidied shelf, such that the sorting efficiency of the commodities on the shelf is improved, and the workload of sorting staff is reduced.

Figure 7:
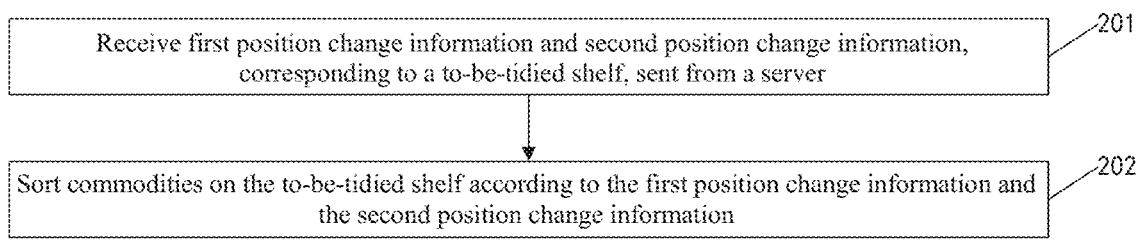
FIG. 7 illustrates a flow diagram of the steps of a commodity sorting method according to one embodiment of the disclosure.

Referring to FIG. 7 which illustrates a flow diagram of the steps of a commodity sorting method according to one embodiment of the disclosure, the commodity sorting method may be applied to a commodity sorting terminal, and may specifically comprise the following steps:

Step 201: first position change information and second position change information, corresponding to a to-be-tidied shelf, sent from the server are received.

This embodiment may be applied to the commodity sorting terminal to sort commodities.

The commodity sorting terminal is a terminal having a task of sorting commodities on shelves. In this disclosure, the commodity sorting terminal may be a mobile terminal such as a mobile phone, a portable android device (PAD) or other mobile electronic devices. The commodity sorting terminal may also be a personal computer (PC) such as a desktop computer, a notebook computer or other electronic devices. The specific type of the commodity sorting terminal depends on business requirements, and this embodiment of the disclosure has no limitation in this aspect.

The first position change information is information indicating that the positions of original commodities on the to-be-tidied shelf need to be changed.

The second position change information is information indicating that the original commodities need to be taken down from the to-be-tided shelf and new commodities need to be placed on the shelf.

After the first position change information and the second position change information, corresponding to the to-be-tidied shelf, sent from the server are received, Step 202 is performed.

Step 202: commodities on the to-be-tidied shelf are sorted according to the first position change information and the second position change information.

After the first position change information and the second position change information are obtained, the commodities on the to-be-tidied shelf may be sorted according to the first position change information and the second position change information, which will be described in detail below in conjunction with the following specific implementation.

In a specific implementation of the disclosure, Step 202 may comprise:

Sub-step H1: the positions of first commodities on the to-be-tidied shelf are adjusted according to the first position change information.

In this embodiment of the disclosure, after the first position change information is obtained, the positions of the first commodities on the to-be-tidied shelf may be adjusted according to the first position change information.

Sub-step H2: second commodities are taken down from the to-be-tidied shelf and third commodities are placed to designated positions of the to-be-tidied shelf according to the second position change information.

After the second position change information is acquired, the second commodities may be taken down from the to-be-tidied shelf and the third commodities may be placed to designated positions of the to-be-tidied shelf The adjustment process will be described in detail below with reference to FIG. 4.

As shown in FIG. 4, the first line illustrates commodities originally placed on the shelf, namely commodity 1, commodity 2, and commodity 10, and the third line illustrates arrangement information of standard commodities, namely commodity 9, commodity 11, commodity 1, commodity 12, commodity 13, commodity 5, commodity 14, commodity 6 and commodity 15. In this case, the position of commodity 9 is adjusted first, that is, commodity 9 is adjusted to the first position in this line as illustrated by the single-headed arrow in FIG. 1; then, commodity 1 is moved backwards, such that a commodity position is reserved between commodity 1 and commodity 9; new commodity 11 is placed at the commodity position reserved between commodity 1 and commodity 9; commodity 2 behind commodity 1 is taken down from the shelf, and new commodity 12 is placed at this position; commodity 3 behind commodity 2 is taken down from the shelf, and new commodity 13 is placed at this position; commodity 4 is taken down from the shelf, commodity 5 is moved forwards by one position, and new commodity 14 is placed at the original position of commodity 5; then, commodity 7 is taken down from the shelf, and new commodity 15 is placed at the original position of commodity 7; and then, commodity 8 and commodity 10 are taken down from the shelf, such that sorting of the commodities on the shelf is completed.

Of course, after the commodities on the to-be-tidied shelf are sorted, management staff of the commodity sorting terminal may upload the degree of completion of commodity sorting of the to-be-tidied shelf to a service terminal. Specifically, all the commodities on the to-be-tidied shelf are compared with the standard commodity arrangement information to obtain a comparison result, and then, the degree of completion of commodity sorting of the to-be-tidied shelf is determined according to the comparison result. For example, if all the commodities on the shelf match the commodity arrangement order, the degree of completion of commodity sorting is 100%. If commodities at 90 of 100 commodity arrangement positions on the shelf match the commodity arrangement order, the degree of completion of commodity sorting is 90%.

After the degree of completion of commodity sorting of the to-be-tidied shelf is obtained by calculation, feedback information corresponding to the degree of completion of commodity sorting may be generated and sent to the server.

After receiving the feedback information, the server may determine shelves with commodities having been sorted. For example, when the degree of completion of commodity sorting of shelf 1 is 100%, it indicates that commodities on shelf 1 have been sorted, and shelf 1 with the commodities having been sorted is recorded by the server.

Or, shelves with commodities not having been sorted may also be determined according to the feedback information. For example, when the degree of completion of commodity sorting of shelf 2 is 90%, it indicates that sorting of commodities on shelf 2 has not been completed, shelf 2 is recorded by the server, and a sorting solution corresponding to shelf 2 is regenerated in the subsequent process to realize resort commodities on shelf 2.

It may be understood that the above example is provided merely for a better understanding of the technical solution of this embodiment of the disclosure and should not be construed as the unique implementation of this embodiment of the disclosure.

In this disclosure, after the commodities on at least one shelf are sorted by means of the commodity sorting terminal, the commodity sorting terminal sends a message indicating that commodity sorting has been completed to the backstage, then the backstage sends corresponding commodity information to an electronic tag at each commodity arrangement position according to the commodity at each position on the at least one shelf, and corresponding commodity information is displayed by each electronic tag. As shown in FIG. 3, the electronic tag corresponding to commodity 1 is ESL1, and the electronic tag corresponding to commodity 1 is ESL2. After the commodity information is sent to the corresponding electronic tags, the electronic tags are able to display the commodity information at the corresponding commodity positions.

In this embodiment of the disclosure, management of shelves of an entity business party may be realized backstage. For example, as shown in FIG. 6 which illustrates a schematic diagram of actual exhibition of backstage management of a system, task batches may be numbered in the backstage management interface, such as a task batch: 7000-20190510145007. After the serial numbers of the task batches are input, the serial number of each shelf will be displayed, and then a commodity sorting result, such as "completed" or "non-completed, corresponding to the serial number of each shelf will be displayed in the interface.

According to the commodity sorting method in this embodiment of the disclosure, the first position change information and the second position change information, corresponding to the to-be-tidied shelf, sent from the server are received, and then the commodities on the to-be-tidied shelf are sorted according to the first position change information and the second position change information. Management staff of the commodity sorting terminal do not need to take all commodities down from the to-be-tidied shelf and just need to adjust the positions of part of the commodities according to the first position change information and the second position change information, such that the sorting efficiency of the commodities on the shelf is improved, and the workload of sorting staff is reduced.

Figure 8:
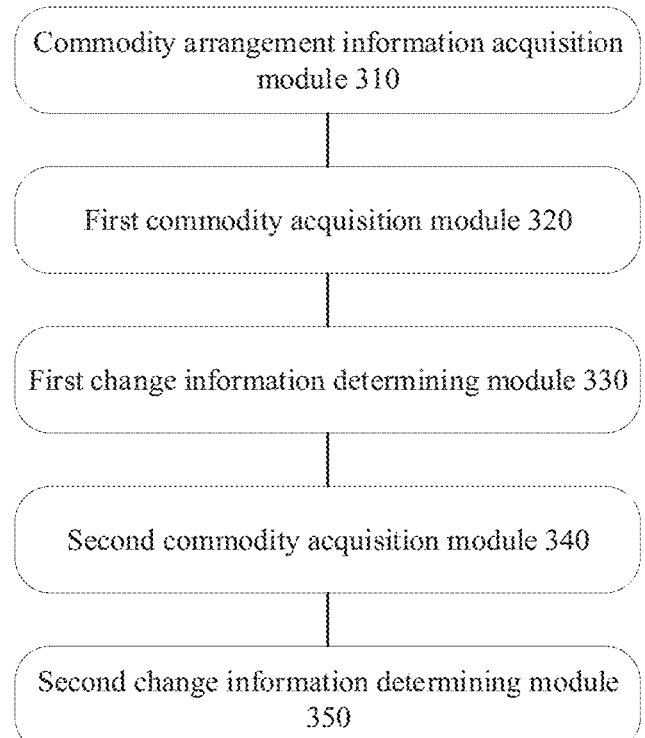
FIG. 8 illustrates a structural diagram of a commodity change information generation apparatus according to one embodiment of the disclosure.

Referring to FIG. 8 which illustrates a structural diagram of a commodity change information generation apparatus according to one embodiment of the disclosure, the commodity change information generation apparatus may be applied to a service terminal, and may specifically comprise:

A commodity arrangement information acquisition module 310 used for acquiring original commodity arrangement information of a to-be-tidied shelf and standard commodity arrangement information corresponding to the to-be-tidied shelf, wherein the original commodity arrangement information includes names and original position information of multiple original commodities, and the standard commodity arrangement information includes names and standard position information of multiple standard commodities;

A first commodity acquisition module is used for acquiring first commodities and second commodities in the multiple original commodities, as well as first commodities and third commodities in the multiple standard commodities, wherein the first commodities are identical commodities both in the multiple original commodities and in the multiple standard commodities, and the second commodities and the third commodities are commodities, different from the identical commodities, in the multiple original commodities and the multiple standard commodities;

A first change information determining module 330 used for determining first position change information of the first commodities according to the original position information and standard position information of the first commodities;

A second change information determining module 340 used for determining second position change information of the second commodities and the third commodities according to the original position information of the second commodities, the standard position information of the third commodities, and the first position change information;

Wherein, commodity change information includes the first position change information and the second position change information.

Optionally, the first change information determining module 330 comprises:

An identical commodity comparison sub-module used for comparing the original position information of the first commodities with the standard position information of the first commodities; and A first change information determining sub-module used for determining the first position change information of the first commodities according to a comparison result.

Optionally, the first change information determining sub-module comprises:

A first change information acquisition unit used for determining that the positions of the first commodities are not changed when the original position information of the first commodities is identical with the standard position information of the first commodities, and taking the information indicating that the positions of the first commodities are not changed as the first position change information.

Optionally, the first change information determining sub-module comprises:

A first arrangement result acquisition unit used for sequentially arranging all the first commodities according to an arrangement order corresponding to the standard position information of all the first commodities when the original position information of the first commodities is different from the standard position information of the first commodities, to obtain a first commodity arrangement result; and A first position change information acquisition unit used for determining position adjustment information of the first commodities according to the first commodity arrangement result, and taking the position adjustment information as the first position change information.

Optionally, the first position change information acquisition unit comprises:

A to-be-changed commodity determining sub-unit used for determining a to-be-changed commodity in the first commodities according to the first commodity arrangement result;

An unshelving information determining sub-module used for generating unshelving information of the to-be-changed commodity according to the original position information of the to-be-changed commodity;

A shelving information determining sub-unit used for generating shelving information of the to-be-changed commodity according to the standard position information of the to-be-changed commodity; and A first position change information determining sub-unit used for determining the unshelving information and the shelving information as the first position change information of the to-be-changed commodity.

Optionally, the second change information determining module 340 comprises:

A commodity change order determining sub-module used for acquiring a commodity change order of the first commodities after the positions of the first commodities are adjusted according to the first position change information;

A second arrangement result determining sub-module used for determining a second commodity arrangement result corresponding to the second commodities according to the commodity change order and the original position information of the second commodities;

A third unshelving information generation sub-module used for generating third unshelving information of the second commodities;

A to-be-shelved commodity position determining sub-module used for determining third shelving information of the third commodities according to the second commodity arrangement result and the standard position information corresponding to the third commodities; and A second change information determining sub-module used for determining the third unshelving information, the to-be-shelved commodity and a shelving position as the second position change information of the second commodities and the third commodities.

Optionally, the to-be-shelved commodity position determining sub-module comprises:

A position comparison unit used for performing position comparison on the standard position information of the third commodities and the second commodity arrangement result; and A shelving position determining unit used for determining a to-be-shelved commodity corresponding to the third shelving information and a shelving position corresponding to the to-be-shelved commodity according to a position comparison result.

According to the commodity change information generation apparatus in this embodiment of the disclosure, the original commodity arrangement information of the to-be-tidied shelf and the standard commodity arrangement information corresponding to the to-be-tidied shelf are acquired, wherein the original commodity arrangement information includes names and original position information of multiple original commodities, and the standard commodity arrangement information includes names and standard position information of multiple standard commodities; the first commodities and the second commodities in the multiple original commodities, as well as the first commodities and the third commodities in the multiple standard commodities are acquired, wherein the first commodities are identical commodities both in the multiple original commodities and in the multiple standard commodities, and the second commodities and the third commodities are commodities, different from the identical commodities, in the multiple original commodities and the multiple standard commodities; the first position change information of the first commodities is determined according to the original position information and standard position information of the first commodities; the second position change information of the second commodities is determined according to the original position information of the second commodities, the standard position information of the third commodities, and the first position change information, wherein commodity change information includes the first position change information and the second position change information. According to this embodiment of the disclosure, commodities on the to-be-tidied shelf are compared with standard commodities to generate position change information of the commodities originally placed on the shelf, and it is not necessary to take all the commodities down from the to-be-tidied shelf, such that the sorting efficiency of the commodities on the shelf is improved, and the workload of sorting staff is reduced.

Figure 9:
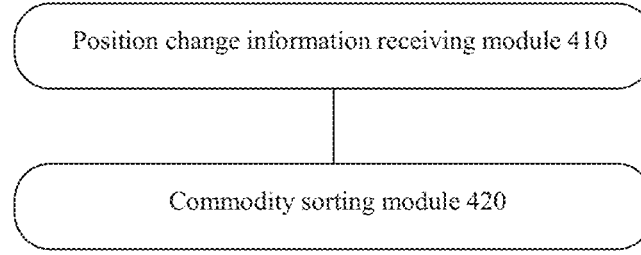
FIG. 9 illustrates a structural diagram of a commodity sorting apparatus according to one embodiment of the disclosure.

Referring to FIG. 9 which illustrates a structural diagram of a commodity sorting apparatus according to one embodiment of the disclosure, the commodity sorting apparatus may be applied to a commodity sorting terminal, and may specifically comprise:

A position change information receiving module 410 used for receiving first position change information and second position change information, corresponding to a to-be-tidied shelf, sent from a server; and A commodity sorting module 420 used for sorting commodities on the to-be-tidied shelf according to the first position change information and the second position change information.

Optionally, the commodity sorting module 420 comprises:

A first commodity position adjustment sub-module used for adjusting the positions of first commodities on the to-be-tidied shelf according to the first position change information; and A second commodity unshelving sub-module used for taking second commodities down from the to-be-tidied shelf according to the second position change information, and placing third commodities to designated positions on the to-be-tidied shelf.

According to the commodity sorting apparatus in this embodiment of the disclosure, the first position change information and the second position change information, corresponding to the to-be-tidied shelf, sent from the server are received, and then the commodities on the to-be-tidied shelf are sorted according to the first position change information and the second position change information. Management staff of the commodity sorting terminal do not need to take all commodities down from the to-be-tidied shelf and just need to adjust the positions of part of the commodities according to the first position change information and the second position change information, such that the sorting efficiency of the commodities on the shelf is improved, and the workload of sorting staff is reduced. The apparatus embodiment described above is merely an illustrative one, wherein units described as separable components may be or may be not physically separated, and components displayed as units may be or may be not physical units, that is, they may be located in the same place or be distributed in multiple network units. All or part of these units may be selected to fulfill the purposes of the solution of this embodiment as actually needed. Those ordinarily skilled in the art may understand and implement this embodiment of the disclosure without creative labor.

It should be noted that for the sake of a brief description, the embodiments of the methods are expressed as combinations of a series of actions. But, those skilled in the art would appreciate that the disclosure will not be limited by the sequences of the actions described above, and some steps of the disclosure may be performed in other sequences or synchronously. Moreover, those skilled in the art would also appreciate that the embodiments described in the specification are preferred ones, and the actions and modules involved in these embodiments are not definitely indispensable to the disclosure.

In addition, one embodiment of the disclosure provides an electronic device, comprising: a processor, a memory and a computer program stored in the memory and capable of running on the processor, wherein the commodity change information generation method or the commodity sorting method is implemented when the processor executes the computer program.

One embodiment of the disclosure further provides a computer-readable storage medium, wherein when an instruction in the storage medium is executed by a processor of an electronic device, the electronic device implements the commodity change information generation method or the commodity sorting method.

The embodiments of all components of the disclosure may be implemented by hardware, software running on one or more processors, or the combination of the hardware and software. Those skilled in the art would appreciate that some or all functions of some or all components in the electronic device in the embodiment of the disclosure may be fulfilled by a microprocessor or a digital signal processor (DSP) in practice. The disclosure may also be implemented as all or part of device or apparatus programs (such as computer programs and computer program products) for executing the methods described here. Such programs implemented by the disclosure may be stored in a computer-readable storage medium, or be in the form of one or more signals, which may be downloaded from the Internet, or be provided by a signal carrier or in other forms.

Figure 10:
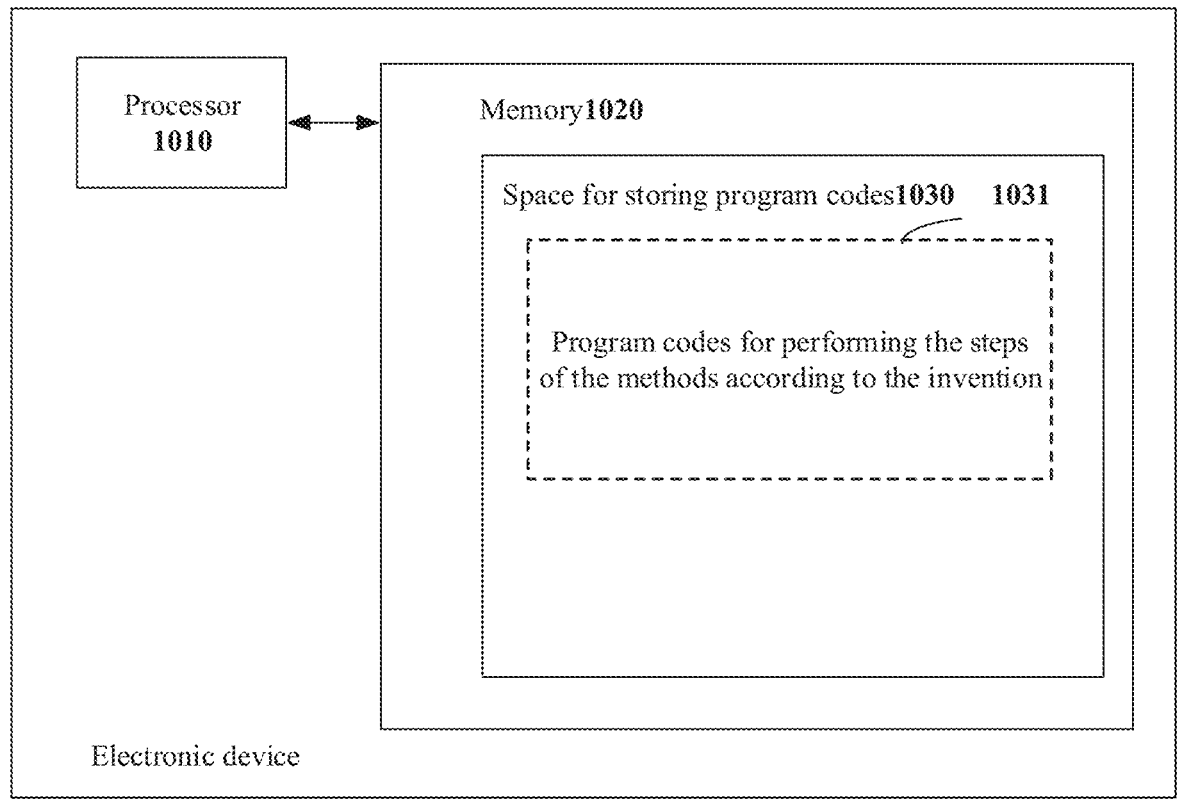
FIG. 10 illustrates a block diagram of an electronic device for implementing the methods of the disclosure.
Figure 11:
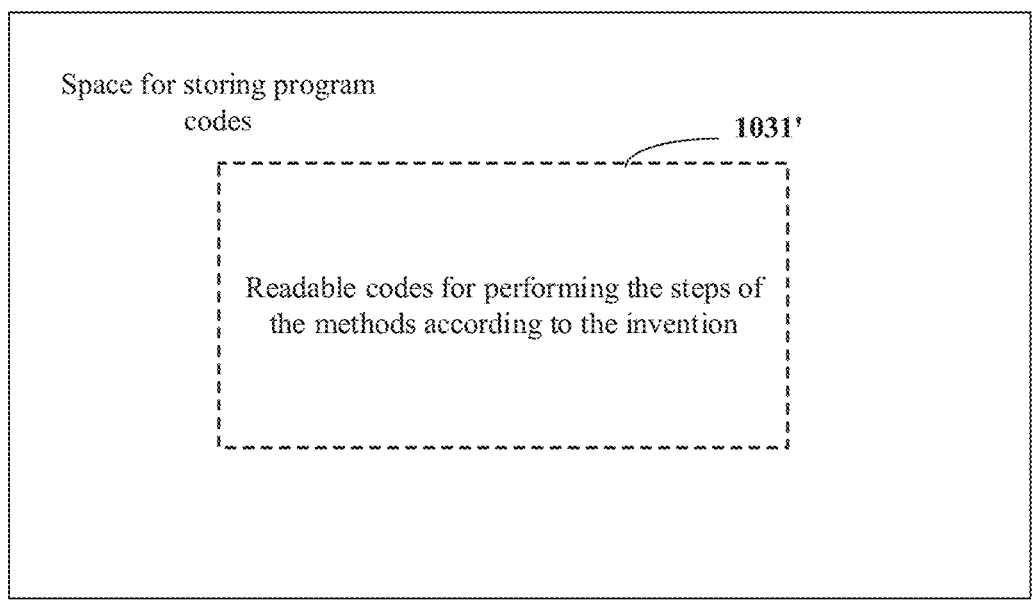
FIG. 11 illustrates a memory cell for storing or carrying program codes for implementing the methods of the disclosure.

For example, FIG. 10 illustrates an electronic device for implementing the methods of the disclosure. The electronic device traditionally comprises a processor 1010, and a computer program product or a computer-readable medium in the form of a memory 1020. The memory 1020 may be an electronic memory such as a flash memory, an EEPROM, an EPROM, a hard disk, or an ROM, and has a memory space 1030 for storing program codes 1031 for implementing any steps of the methods mentioned above. For example, the memory space 1030 for storing the program codes may comprise program codes for implementing the steps of the methods mentioned above. These program codes may be read from one or more computer program products, or be written into the one or more computer program products. These computer program products comprise program code carriers such as hard disks, CDs, memory cards or floppy disks, and are generally portable or fixed memory cells shown in FIG. 11. The memory cell may have a memory segment or memory space configured similar to the memory 1020 in the electronic device shown in FIG. 10. The program codes may be compressed in an appropriate form. Generally, the memory cell comprises computer-readable codes 1031', namely codes capable of being read by a processor such as the processor 1010. When these codes are run by the electronic device, the electronic device performs the steps of the methods mentioned above.

The embodiments in this specification are described progressively, the differences from other embodiments are emphatically stated in each embodiment, and the similarities of these embodiments may be cross-referenced.

Finally, it should be noted that relational terms such as "first" and "second" in this specification are merely used to distinguish one entity or operation from the other one, and do not definitely indicate or imply that these entities or operations have any actual relations or sequences. In addition, the term "comprise" or "include" or any other variations are intended to refer to non-exclusive inclusion, so that a process, method, commodity or device comprising a series of elements not only comprises these elements listed, but also comprises other elements that are not clearly listed, or inherent elements of the process, method, commodity or device. Unless otherwise clearly specified, an element defined by the expression "comprise a" shall not exclusive of other identical elements in a process, method, commodity or device comprising said element.

The commodity change information generation method and apparatus, the commodity sorting method and apparatus, the electronic device and the computer-readable storage medium provided by the disclosure are introduced in detail above, specific examples are used in this specification to expound the principle and implementation of the disclosure, and the description of the above embodiments is merely used to assist those skilled in the art in understanding the methods and core concept thereof of the disclosure. In addition, those ordinarily skilled in the art can make changes to the specific implementation and application scope based on the concept of the disclosure. So, the contents in the specification should not be construed as limitations of the disclosure.

The invention claimed is:

1. A commodity change information generation method, being applied to a service terminal, and comprising:

by using a camera device, obtaining a commodity layout corresponding to a to-be-tidied shelf;
according to the commodity layout, acquiring original commodity arrangement information of the to-be-tidied shelf;
acquiring standard commodity arrangement information corresponding to the to-be-tidied shelf;
wherein the original commodity arrangement information comprises names and original position information of a plurality of original commodities, and the standard commodity arrangement information comprises names and standard position information of a plurality of standard commodities;
acquiring identical commodities in the plurality of original commodities and the plurality of standard commodities, and taking the identical commodities as first commodities;
determining first position change information of the first commodities according to the original position information and standard position information of the first commodities;
acquiring second commodities in the plurality of original commodities and third commodities in the plurality of standard commodities, wherein the second commodities, the third commodities and the first commodities are different; and
determining second position change information of the second commodities and the third commodities according to the original position information of the second commodities, the standard position information of the third commodities, and the first position change information;
wherein, commodity change information comprises the first position change information and the second position change information.

2. The commodity change information generation method according to claim 1, wherein the step of determining first position change information of the first commodities according to the original position information and standard position information of the first commodities comprises:
comparing the original position information of the first commodities with the standard position information of the first commodities; and
determining the first position change information of the first commodities according to a comparison result.

3. The commodity change information generation method according to claim 2, wherein the step of determining the first position change information of the first commodities according to the comparison result comprises:
determining the positions of the first commodities are not changed when the original position information of the first commodities is identical with the standard position information of the first commodities, and taking the information indicating that the positions of the first commodities are not changed as the first position change information.

4. The commodity change information generation method according to claim 2, wherein the step of determining the first position change information of the first commodities according to a comparison result comprises:
sequentially disposing all the first commodities according to an arrangement order corresponding to the standard position information of all the first commodities when the original position information of the first commodities is different from the standard position information of the first commodities to obtain a first commodity arrangement result; and determining position adjustment information of the first commodities according to the first commodity arrangement result, and taking the position adjustment information as the first position change information.

5. The commodity change information generation method according to claim 4, wherein the step of determining position adjustment information of the first commodities according to the first commodity arrangement result, and taking the position adjustment information as the first position change information comprises:
   determining a to-be-changed commodity in the first commodities according to the first commodity arrangement result;
   generating unshelving information of the to-be-changed commodity according to the original position information of the to-be-changed commodity;
   generating shelving information of the to-be-changed commodity according to the standard position information of the to-be-changed commodity; and
   determining the unshelving information and the shelving information as the first position change information of the to-be-changed commodity.

6. The commodity change information generation method according to claim 5, wherein when the number of the to-be-changed commodities is greater or equal to two, after the step of determining the to-be-changed commodities in the first commodities according to the first commodity arrangement result, the method further comprises:
   determining the commodity ranked first in the to-be-changed commodities as a first to-be-adjusted commodity according to assorting order corresponding to the original position information of the to-be-changed commodities, and determining other commodities in the to-be-changed commodities as second to-be-adjusted commodities.

7. The commodity change information generation method according to claim 6, wherein after the step of determining the commodity ranked first in the to-be-changed commodities as a first to-be-adjusted commodity according to assorting order corresponding to the original position information of the to-be-changed commodities, and determining other commodities in the to-be-changed commodities as second to-be-adjusted commodities, the method further comprises:
   generating first unshelving information of the first to-be-adjusted commodity according to the original position information of the first to-be-adjusted commodity, and determining first shelving position information of the first to-be-adjusted commodity according to the standard position information of the first to-be-adjusted commodity;
   generating second unshelving information of the second to-be-adjusted commodities according to the original position information of the second to-be-adjusted commodities, and determining second shelving position information of the second to-be-adjusted commodities according to the standard position information of the second to-be-adjusted commodities; and
   determining the first unshelving information and the first shelving position information as first position change information of the first to-be-adjusted commodity, and determining the second unshelving information and the second shelving position information as first position change information of the second to-be-adjusted commodities.

8. The commodity change information generation method according to claim 1, wherein the step of determining second position change information of the second commodities and the third commodities according to the original position information of the second commodities, the standard position information of the third commodities, and the first position change information comprises:
   acquiring a commodity change order of the first commodities after the positions of the first commodities are adjusted according to the first position change information;
   determining a second commodity arrangement result corresponding to the second commodities according to the commodity change order and the original position information of the second commodities;
   generating third unshelving information of the second commodities;
   determining third shelving information of the third commodities according to the second commodity arrangement result and the standard position information corresponding to the third commodities; and
   determining the third unshelving information and the third shelving information as the second position change information of the second commodities and the third commodities.

9. The commodity change information generation method according to claim 8, wherein the step of determining third shelving information of the third commodities according to the second commodity arrangement result and the standard position information corresponding to the third commodities comprises:
   performing position comparison on the standard position information of the third commodities and the second commodity arrangement result; and
   determining a to-be-shelved commodity corresponding to the third shelving information and a shelving position corresponding to the to-be-shelved commodity according to a position comparison result.

10. A commodity sorting method, being applied to a commodity sorting terminal, and comprising:
    receiving first position change information and second position change information, corresponding to a to-be-tidied shelf, sent from a server, wherein the server is regarded as the service terminal according to claim 1; and
    sorting commodities on the to-be-tidied shelf according to the first position change information and the second position change information.

11. The commodity sorting method according to claim 10, wherein the step of sorting commodities on the to-be-tidied shelf according to the first position change information and the second position change information comprises:
    adjusting positions of first commodities on the to-be-tidied shelf according to the first position change information; and
    taking second commodities down from the to-be-tidied shelf according to the second position change information, and placing third commodities to designated positions on the to-be-tidied shelf.

12. The commodity sorting method according to claim 10, wherein after the step of sorting commodities on the to-be-tidied shelf according to the first position change information and the second position change information, the method further comprises:
    acquiring a degree of completion of commodity sorting of the to-be-tidied shelf; and
    generating feedback information corresponding to the degree of completion of commodity sorting according to the degree of completion of commodity sorting, and uploading the feedback information to the server.

13. The commodity sorting method according to claim 12, wherein the step of acquiring a degree of completion of commodity sorting of the to-be-tidied shelf comprises:
- comparing all the commodities on the to-be-tidied shelf with standard commodity arrangement information to obtain a comparison result; and
- determining the degree of completion of commodity sorting according to the comparison result.

14. A server for commodity change information generation and comprising:
- a processor, and
- a memory storing computer-readable code, wherein when the computer-readable code is executed by a processor, the server is made to perform operations comprising:
- by using a camera device, obtaining a commodity layout corresponding to a to-be-tidied shelf;
- according to the commodity layout, acquiring original commodity arrangement information of the to-be-tidied shelf;
- acquiring standard commodity arrangement information corresponding to the to-be-tidied shelf;
  - wherein the original commodity arrangement information includes names and original position information of multiple original commodities, and the standard commodity arrangement information includes names and standard position information of multiple standard commodities;
- acquiring identical commodities in the multiple original commodities and the multiple standard commodities and taking the identical commodities as first commodities
- determining first position change information of the first commodities according to the original position information and standard position information of the first commodities;
- acquiring second commodities in the multiple original commodities and third commodities in the multiple standard commodities, wherein the second commodities, the third commodities and the first commodities are different; and
- determining second position change information of the second commodities and the third commodities according to the original position information of the second commodities, the standard position information of the third commodities, and the first position change information;
- wherein, commodity change information includes the first position change information and the second position change information.

15. The server according to claim 14, wherein the operation of determining first position change information of the first commodities according to the original position information and standard position information of the first commodities comprises:
- comparing the original position information of the first commodities with the standard position information of the first commodities; and
- determining the first position change information of the first commodities according to a comparison result.

16. The server according to claim 15, wherein the operation of determining the first position change information of the first commodities according to a comparison result comprises:
- determining that positions of the first commodities are not changed when the original position information of the first commodities is identical with the standard position information of the first commodities, and taking the information indicating that the positions of the first commodities are not changed as the first position change information.

17. The server according to claim 15, wherein the operation of determining the first position change information of the first commodities according to a comparison result comprises:
- sequentially arranging all the first commodities according to an arrangement order corresponding to the standard position information of all the first commodities when the original position information of the first commodities is different from the standard position information of the first commodities, to obtain a first commodity arrangement result; and
- determining position adjustment information of the first commodities according to the first commodity arrangement result, and taking the position adjustment information as the first position change information.

18. An apparatus for performing commodity sorting according to claim 10, comprising:
- a processor, and
- a memory storing computer-readable code, wherein when the computer-readable code is executed by a processor, the apparatus is made to perform operations comprising:
- receiving first position change information and second position change information, corresponding to a to-be-tidied shelf, sent from a server; and
- sorting commodities on the to-be-tidied shelf according to the first position change information and the second position change information.

19. The apparatus according to claim 18, wherein the operation of sorting commodities on the to-be-tidied shelf according to the first position change information and the second position change information comprises:
- adjusting positions of first commodities on the to-be-tidied shelf according to the first position change information; and
- taking second commodities down from the to-be-tidied shelf according to the second position change information, and placing third commodities to designated positions on the to-be-tidied shelf.

20. The apparatus according to claim 18, wherein the operations further comprise:
- acquiring a degree of completion of commodity sorting of the to-be-tidied shelf; and
- generating feedback information corresponding to the degree of completion of commodity sorting according to the degree of completion of commodity sorting, and uploading the feedback information to the server.

* * * * *